United States Patent [19]

Sim

[11] Patent Number: 5,411,678

[45] Date of Patent: May 2, 1995

[54] PAINT STRIPPER

[75] Inventor: Johnny O. Sim, Alhambra, Calif.

[73] Assignee: McGean-Rohco, Inc., Cleveland, Ohio

[21] Appl. No.: 192,644

[22] Filed: Feb. 7, 1994

[51] Int. Cl.$^6$ .......................... C11D 3/28; C11D 3/44; C11D 1/68; C11D 1/835

[52] U.S. Cl. .................................. 252/548; 252/158; 252/162; 252/171; 252/DIG. 8; 252/541; 252/542; 252/544; 252/172; 252/173; 252/DIG. 14

[58] Field of Search ............... 252/143, 158, 548, 162, 252/170, 171, DIG. 8, 541, 542, 544, 172, 173, DIG. 14; 134/38

[56] References Cited

U.S. PATENT DOCUMENTS

| | | | |
|---|---|---|---|
| 2,704,278 | 3/1955 | Gamrath | 252/171 X |
| 4,572,792 | 2/1986 | Muller | 252/162 X |
| 4,732,695 | 3/1988 | Francisco | 252/162 |
| 4,749,510 | 6/1988 | Nelson | 252/143 X |
| 5,015,410 | 5/1991 | Sullivan | 252/162 X |
| 5,098,591 | 3/1992 | Stevens | 252/162 |
| 5,124,062 | 6/1992 | Stevens | 252/162 |
| 5,154,848 | 10/1992 | Narayanan et al. | 252/162 |

FOREIGN PATENT DOCUMENTS 0336400 10/1989 European Pat. Off. .
0497130 8/1992 European Pat. Off. .

OTHER PUBLICATIONS

"Remover, Paint, Non-Hazardous Air Pollutant", Dept. of Defense, Dec. 1993, MIL-R-29603.

Primary Examiner—Paul Lieberman
Assistant Examiner—Douglas J. McGinty
Attorney, Agent, or Firm—Renner, Otto, Boisselle & Sklar

[57] ABSTRACT

A paint-stripper composition is described which comprises
(A) at least one organic solvent selected from the group consisting of benzyl alcohol, alkyl-substituted benzyl alcohols, furfuryl alcohol, alkyl-substituted furfuryl alcohols and acetylenic alcohols containing from 3 to about 5 carbon atoms;
(B) pyrrole as a co-solvent; and
(C) at least one other organic amine compound as an activator.

A method of stripping paint from a surface also is described, and the method comprises
(A) contacting the paint with a paint-stripper composition which is free of organic phosphites and phosphines and comprises
  (A-1) at least one organic solvent selected from the group consisting of benzyl alcohol alkyl-substituted benzyl alcohols, furfuryl alcohol, alkyl-substituted furfuryl alcohols and acetylenic alcohols containing from 3 to about 5 carbon atoms; and
  (A-2) at least 0.7% by weight of at least one organic amine compound as an activator for a period of time sufficient to reduce the adhesion of the paint to the surface; and
(B) removing said paint and paint-stripper composition from said surface.

7 Claims, No Drawings

PAINT STRIPPER

TECHNICAL FIELD

This invention relates to paint strippers and to methods of stripping paint from surfaces. More particularly, the invention relates to paint strippers containing at least one solvent and at least one organic amine compound.

BACKGROUND OF THE INVENTION

The terms "paint stripper" and "paint remover" as used in this application refer to chemical compositions which can strip or facilitate stripping of coatings such as paint which are used to protect and beautify substrates. With the introduction of new and more durable types of synthetic resins and polymers in protective and decorative coatings, the problem of stripping the coating has become increasingly difficult. Prior art paint removers and strippers typically contain blends of aromatic solvents, ketones, paraffin, methanol and diluents, for example, mineral spirits. Traditional paint strippers have contained hazardous materials such as phenol, toluene and methylethyl ketone, and the most effective paint strippers were based on methylene chloride as the primary solvent. Methylene chloride is a very effective solvent, and paint strippers containing methylene chloride are effective for quickly softening most types of paints. Methylene chloride, however, is a highly volatile liquid thereby shortening the work life. In addition, methylene chloride has been discovered to cause tumors and cancer in animals in laboratory tests and, accordingly, attempts are being made in the industry and by governmental regulatory agencies to eliminate or greatly reduce its use.

A number of paint removers and paint strippers have been introduced in recent years which avoid the use of methylene chloride and flammable, volatile and toxic chemicals such as benzene, toluene, phenol, acetone, etc. N-methyl-2-pyrrolidone (NMP) has been employed in place of methylene chloride as a solvent ingredient in paint-stripper compositions as suggested in several patents. U.S. Pat. No. 4,759,510, for example, describes a paint stripper having a low volatility which includes about 20% to 90% by weight of NMP and 30% to 70% by weight of an aromatic hydrocarbon solvent. U.S. Pat. No. 4,836,950 describes liquid formulations for removing screen printing inks which comprises a mixture of NMP and gammabutyrolactone.

U.S. Pat. No. 5,124,062 describes paint-stripper compositions having high flash points and low-boiling volatile organic chemicals which comprise a mixture of a terpene compound containing at least 10 carbon atoms, NMP and a terpene emulsifying surfactant.

Recently, non-hazardous products for removing paint have been introduced which incorporate the use of benzyl alcohol as a principal solvent. The performance of benzyl alcohol-based strippers is improved when activated with an acid, but such stripping agents may deleteriously affect high strength steel which is used, for example, in aircraft landing gear parts. Benzyl alcohol-based strippers also have been available which contain an alkaline component rather than an acid for activation.

EP Patent Application 497,130 A2 describes paint-stripper formulations containing a solvent system comprising an ester of a benzyl or methyl benzyl alcohol. In particular, the formulations comprise benzyl alcohol/benzyl formate/formic acid, and such formulations are reported to strip polyurethane and epoxy paint systems more than 2.5 times as fast as equivalent benzyl acetate/benzyl alcohol/acetic acid formulations.

Paint strippers and paint removers are utilized in the aerospace industry for removing paints from commercial and military jet aircraft. Periodic paint removal is required for aesthetic reasons, for a change of colors, or more importantly, for inspection of the air frame as required for safe operation of an aircraft.

SUMMARY OF THE INVENTION

A paint-stripper composition is described which comprises
 (A) at least one organic solvent selected from the group consisting of benzyl alcohol, alkyl-substituted benzyl alcohols, furfuryl alcohol, alkyl-substituted furfuryl alcohols and acetylenic alcohols containing from 3 to about 5 carbon atoms;
 (B) pyrrole as a co-solvent; and
 (C) at least one other organic amine compound as an activator.

A method of stripping paint from a surface also is described, and the method comprises
 (A) contacting the paint with a paint-stripper composition which is free of organic phosphites and phosphines and comprises
  (A-1) at least one organic solvent selected from the group consisting of benzyl alcohol alkyl-substituted benzyl alcohols, furfuryl alcohol, alkyl-substituted furfuryl alcohols and acetylenic alcohols containing from 3 to about 5 carbon atoms; and
  (A-2) at least 0.7% by weight of at least one organic amine compound as an activator
 for a period of time sufficient to reduce the adhesion of the paint to the surface; and
 (B) removing said paint and paint-stripper composition from said surface.

DESCRIPTION OF THE PREFERRED EMBODIMENTS

One essential component of the paint-stripper compositions of the present invention is (A) at least one organic solvent which is selected from the group consisting of benzyl alcohol, alkyl-substituted benzyl alcohols, furfuryl alcohol, alkyl-substituted furfuryl alcohols and acetylenic alcohols which contain from 3 to about 5 carbon atoms. The amount of the organic solvent (A) incorporated into the paintstripper compositions of the present invention is at least about 10% by weight. Generally, the compositions will contain from about 10% to about 95 % by weight of the organic solvent (A), and more often, from about 10% to about 80% by weight, and in some circumstances from about 10% to about 40% by weight.

Any of the alkyl-substituted benzyl alcohols may be utilized, and the alkyl groups generally contain from 1 to about 4 carbon atoms. Specific examples of the alkyl-substituted benzyl alcohols include: alpha-methylbenzyl alcohol, alpha-ethylbenzyl alcohol, ortho-methylbenzyl alcohol, meta-methylbenzyl alcohol, para-methylbenzyl alcohol, ortho-ethylbenzyl alcohol, para-ethylbenzyl alcohol, para-propylbenzyl alcohol, para-n-butylbenzyl alcohol and para-t-butylbenzyl alcohol.

The alkyl group in the alkyl-substituted furfuryl alcohols may contain from 1 to 4 carbon atoms. Examples of substituted furfuryl alcohols include alpha-methylfurfuryl alcohol, alpha-ethylfurfuryl alcohol, 5-methylfurfuryl alcohol, etc.

The acetylenic alcohols which may be utilized as the organic solvent in these paint-stripper compositions of the present invention contain from about 3 to about 5 carbon atoms, and the acetylenic alcohols may be primary or secondary alcohols. Primary alcohols are preferred. Examples of acetylenic alcohols which may be used in the present invention include propargyl alcohol, 2-butyn-1-ol, 3-butyn-1-ol, 3-butyn-2-ol, 1-pentyn-3-ol, 2-pentyn-1-ol, 3-pentyn-1-ol, 4-pentyn-1-ol, In one preferred embodiment, the organic solvents (A) utilized in the present invention are those containing a primary hydroxyl group, that is, a —CH$_2$OH group. That is, in a preferred embodiment of the invention the organic solvents are selected from a group consisting of benzyl alcohol, ring-substituted alkylbenzyl alcohols, furfuryl alcohol, furfuryl alcohols which contain an alkyl substituent on the ring, and those acetylenic alcohols wherein the hydroxyl group is on a terminal methylene group such as propargyl alcohol, 2-butyn-1-ol, 3-butyn-1-ol, 2-pentyn-1-ol, 3-pentyn-1-ol and 4-pentyn-1-ol.

The paint-stripper compositions of the present invention also contain at least one organic mine compound as an activator, and the at least one amine generally is present in amounts of from about 0.1% or about 0.7 % up to about 25 % by weight, more often from about 1% to about 25 % by weight. When pyrrole is present in the paint-stripper composition either alone or with one or more other amines, the total amount of amine compound may be a high as 40% by weight.

A wide variety of organic amine compounds can be included as activators in the paint-stripper compositions of the invention. In one embodiment, the amines which may be used in the paint-stripper compositions of the present invention include one or more amines from the group of pyrrole, aliphatic amines, cycloaliphatic amines and heterocyclic amines. In another embodiment, the amines are primary aliphatic amines or aliphatic oximes containing at least 2 carbon atoms. In yet another embodiment, the aliphatic amines comprise oxyalkyl amines, hydroxyl amines and/or diamines.

Examples of aliphatic and cycloaliphatic primary amines useful in the present invention include ethylamine, propylamine, isopropylamine, butylamine, amylamine, furfurylamine and cyclohexylamine. The amines may be secondary amines such as dimethylamine, diethylamine, methylpropylamine, etc., or tertiary amines such as triethylamine.

Hydroxylamines are also useful in the present invention and specific examples of such amines include: ethanolamine; 3-amino-l-propanol; 2-amino-2-methyl-1-propanol; 2-amino-2-ethyl-1,3-propanediol; tris(hydroxymethyl)-amino methane; N-methyl ethanolamine; 2-diethylamino-2-methyl-1-propanol. Alkoxylated amines (oxyalkylamines) also can be used in the present invention and these may be represented by 2-methoxyethylamine; 3-methoxypropylamine; 2-ethoxyethylamine; 3-ethoxypropylamine; etc.

Diamines are also useful, and the aliamines may contain hydroxy groups. Examples of useful aliamines include aliphatic diamines such as ethylenediamine, 1,3-diaminopropane, 1,2-diaminopropane, 1,4-diaminobutane, 1,6-diaminohexane, 3-dimethyl-aminopropylamine, aminoethyl ethanolamine, etc.

In another embodiment, the amine may be an aliphatic oxime containing at least 2 carbon atoms such as acetaldehyde oxime, acetone oxime, butanone oxime, methylethylketoxime, diethylketoxime, etc. Mixtures of hydroxyamines and oximes are particularly useful when it is desired to reduce corrosion.

In addition to the aliphatic mines, heterocyclic mines may be utilized. These include, for example, piperazine and its derivatives, piperidine and its derivatives, morpholine and its derivatives, etc. Specific examples of such heterocyclic compounds include morpholine, 4-methyl morpholine and N-aminopropyl morpholine; piperazine, 1-methyl piperazine, 2-methyl-piperazine and N-aminoethyl piperazine; piperidine, 4-aminomethyl-piperidine, 2-methyl-piperidine, 3-methylpiperidine, 4-methyl-piperidine, etc.

In one preferred embodiment, the paint-stripper compositions of the present invention comprise at least two amines, pyrrole which serves as a co-solvent and an activator and at least one other amine compound which is an activator. When pyrrole is present, the paint-stripper compositions may contain up to about 40% by weight of pyrrole since the pyrrole acts as a co-solvent as well as an activator. More often, when mixtures of pyrrole and at least one other organic amine are utilized in the paint-stripper compositions of the present invention, satisfactory results are obtained when the pyrrole is present in an amount of from about 1% to about 20% by weight, and the at least one other amine is present in an amount of from about 0.1% to about 8 % by weight.

In one preferred embodiment, the paint-stripper compositions of the invention are free of halogenated hydrocarbons such as methylene chloride. In another embodiment, the paint-stripper compositions are free of organic phosphites (particularly alkyl phosphites) and organic phosphines (particularly aryl phosphines) when the compositions do not contain pyrrole.

The paint-stripper compositions of the present invention also may be aqueous compositions comprising (A) from about 10% to about 80% by weight of at least one organic solvent selected from the group consisting of benzyl alcohol alkyl-substituted benzyl alcohols, furfuryl alcohol, alkyl-substituted furfuryl alcohols and acetylenic alcohols containing from 3 to about 5 carbon atoms;

(B) from about 1% to about 20% by weight of pyrrole;

(C) from about 0.1% to about 8% by weight of at least one other organic amine compound as an activator; and (D) water.

Although various amounts of water can be incorporated into the aqueous paint strippers, generally the aqueous compositions contain at least about 10% by weight of water, and in other embodiments, the aqueous compositions contain at least about 50% by weight of water. The aqueous compositions are generally in the form of emulsions.

Other components may be included in the paint-stripping compositions of the present invention such as thickeners, stabilizers, surfactants, various inhibitors and antioxidants, alkalinity agents, etc.

Thickeners or thixotropic agents are included in the paint-stripper compositions of the present invention to increase the viscosity of the composition as desired. For example, when the paint-stripping compositions are to be applied to various surfaces such as vertical or overhead surfaces, thickeners are normally incorporated into the composition so the paint stripper will cling to the surface. However, when the paint stripping of articles is to be conducted in a tank containing the paint stripper, and the articles are deposited into the tank (i.e., immersed in the paint-stripper composition) for a given period of time, the paint-stripping compositions are preferably of low viscosity. Generally the compositions of the invention will contain from about 0.1% to about 4 % by weight, more often from about 0.1% to about 1% by weight of the thickener. Cellulosic thickeners, including thickeners based on methyl cellulose such as those available commercially from Dow Chemical Co. under the general trade designation Methocel are useful. Specific examples of Methocels are Methocels 311, E-4M, F-4M, J-75M, K-15M and XUS. Hydroxypropyl celluloses are also available commercially such as from Hercules Inc. under the general designation Klucell. Ethyl celluloses and hydrophobic treated clays such as Bentone 27, a product of NL Industries, are other examples of useful thickening and thixotropic agents.

Alkalinity agents also can be incorporated into the paint-stripping compositions of the present invention in applications to neutralize the acidity contributed by some components such as inhibitors, thickeners, suffactants, etc. Examples of useful alkalinity agents include alkali metal hydroxides and alkoxides such as sodium methoxide, potassium methoxide, sodium ethoxide, etc. The amount of alkalinity agent included in the paint-stripping compositions of the present invention may rage from about 0.1% to about 1 or 2 % by weight. The amount of alkalinity agent included in any particular paint-stripping composition will depend on the amount of the acid-contributing component(s).

Surfactants can be employed to increase the wetting characteristics of the compositions, and the suffactants may be anionic, nonionic, cationic, or amphoteric suffactants or mixtures thereof. In one embodiment, the suffactants utilized are nonionic suffactants such as, for example, acetylenic polyols such as tetramethyl-decynediol (Surfynol 104 or 104A, Air Products, Inc.), aryloxy alkanols such as phenoxy ethanol, phenoxy glycol, etc. Typically, the surfactants utilized in an amount ranging from about 0.01 to about 5 % or 10%.

Various inhibitors also can be incorporated into the paint-stripping compositions of the invention, generally, in combination with certain surfactants. Examples of inhibitors include triazoles such as tolyl triazole, and silicates such as sodium silicate. Only small amounts of the inhibitors are generally needed and such amounts range from about 0.01 to about 2% or 3% by weight.

The paint-stripping compositions of the present invention can be prepared by mixing the various components in any order. When the paint-stripper compositions of the invention are aqueous compositions, it is preferred that an organic mixture and an aqueous mixture are separately prepared and thereafter blended to form an emulsion. For example, the thickener such as Methocel is carefully dispersed in the solvent such as benzyl alcohol and a clear thick solution is formed. Surfactants such as Surfynol 104A may then be added to the thick solution. A separate aqueous composition is prepared containing water, the amine, inhibitors, etc., and the organic mixture is added to the aqueous mixture with good agitation to form a creamy emulsion. When the paint-stripping compositions of the present invention contain a mixture of pyrrole and one other amine, the above procedure is followed and the pyrrole may be added after the emulsion is formed. A preferred procedure for preparing the paint-stripping composition of the present invention illustrated in Example 11 below, is as follows. In one container, 0.2 part of Methocel XUS-40443 is carefully dispersed in 35 parts of benzyl alcohol and mixed until a clear thick solution is formed. Surfynol 104A (0.4 part) is thereafter dispersed in the solution. In a separate container, a mixture is prepared with good agitation by adding 0.4 part of Carbopol 690 (B. F. Goodrich), 0.1 part of sodium hydroxide, 0.3 part of triethanolamine and 0.1 part of sodium silicate to 63.5 parts of water. The organic mixture is added to the water mixture with good agitation resulting in the formation of a creamy emulsion. Pyrrole (8 parts) and 0.5 part of tolyl triazole are added individually after the emulsion is formed.

The following examples illustrate the paint-stripper compositions of the present invention which contain pyrrole and at least one other amine. Unless otherwise indicated, all pans and percentages are by weight, temperatures are in degrees Centigrade, and pressures are at or near atmospheric pressure.

EXAMPLE 1

|  | %/Wt. |
|---|---|
| Furfuryl alcohol | 80 |
| Pyrrole | 15 |
| Methoxypropylamine | 5 |

EXAMPLE 2

| Benzyl alcohol | 80 |
|---|---|
| Pyrrole | 12 |
| Monoethanolamine | 8 |

EXAMPLE 3

| Benzyl alcohol | 35 |
|---|---|
| Pyrrole | 12 |
| Monoethanolamine | 2 |
| Water | remainder |

EXAMPLE 4

| Propargyl alcohol | 30 |
|---|---|
| Pyrrole | 8 |
| Methoxypropylamine | 2 |
| Water | remainder |

EXAMPLE 5

| Benzyl alcohol | 30 |
|---|---|
| Pyrrole | 3 |
| Monoethanolamine | 2 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE 6

| Benzyl alcohol | 25 |
|---|---|
| Pyrrole | 8 |
| Monoethanolamine | 2 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE 7

| Benzyl alcohol | 30 |
|---|---|
| Pyrrole | 3 |
| Monoethanolamine | 2 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE 8

| Benzyl alcohol | 28 |
|---|---|
| Pyrrole | 5 |
| Monoethanolamine | 2 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE 9

| Benzyl alcohol | 20 |
|---|---|
| Pyrrole | 8 |
| Monoethanolamine | 2 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE 10

| Benzyl alcohol | 21 |
|---|---|
| Pyrrole | 12 |
| Monoethanolamine | 2 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE 11

| Benzyl alcohol | 24.5 |
|---|---|
| Pyrrole | 8.0 |
| Monoethanolamine | 2.0 |
| Methocel XUS 40443 | 0.2 |
| Carbopol 690 | 0.6 |
| Surfynol 104A | 0.2 |
| Tolyltriazole | 0.5 |
| Sodium Silicate | 0.4 |
| Water | remainder |

EXAMPLE 12

| Benzyl alcohol | 32 |
|---|---|
| Pyrrole | 3 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE 13

| Benzyl alcohol | 30 |
|---|---|
| Pyrrole | 5 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

The invention of this application also relates to a method of stripping paint from a surface which comprises (A) contacting the paint with a paint-stripper composition which is free of organic phosphites and phosphines and comprises (A-1) at least one organic solvent selected from the group consisting of benzyl alcohol alkyl-substituted benzyl alcohols, furfuryl alcohol, alkyl-substituted furfuryl alcohols and acetylenic alcohols containing from 3 to about 5 carbon atoms; and (A-2) at least about 0.7% by weight of at least one organic amine compound as an activator for a period of time sufficient to reduce the adhesion of the paint to the surface; and (B) removing said paint and paint-stripper composition from said surface.

In one embodiment of this method, the paint-stripper composition utilized may contain only one amine, and this amine may be pyrrole or any of the other amines described above. Although the individual amines are effective in stripping paint from a surface, the presently preferred paint-stripper composition for use in the method of the present invention comprises a mixture of pyrrole and at least one other amine as described above.

In the method of the invention, the paint to be removed from a surface is contacted with the paint-stripper compositions for a period of time sufficient to reduce the adhesion of the paint to the surface. Contact may be effected by immersion of the painted surface in a container containing the paint stripper, or the paint stripper can be applied to the painted surface by any technique known in the art such as spraying, brushing, rolling, etc. A reduction of the adhesion to the paint to the surface is generally exhibited by bubbling and lifting of the paint from the surface so that the paint can thereafter be easily removed from the surface. The time required to effect the stripping of the paint will vary depending upon a variety of factors including the nature of the paint, the age of the paint, the surface which is painted, etc. Paints which can be stripped with the stripping composition of the present invention include alkyls, acrylics, polyurethanes, epoxies, epoxy/urethane, etc.

The following examples illustrate additional paint-stripping compositions which can be utilized in the method of the present invention.

Example A

|  | %/Wt. |
| --- | --- |
| Benzyl alcohol | 60 |
| Pyrrole | 40 |

Example B

|  |  |
| --- | --- |
| Benzyl alcohol | 35 |
| Pyrrole | 10 |
| Water | remainder |

Example C

|  |  |
| --- | --- |
| Benzyl alcohol | 35 |
| Monoethanolamine | 10 |
| Water | remainder |

Example D

|  |  |
| --- | --- |
| Benzyl alcohol | 32 |
| Methoxypropylamine | 3 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE E

|  |  |
| --- | --- |
| Benzyl alcohol | 32 |
| Monoethanolamine | 3 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

EXAMPLE F

|  |  |
| --- | --- |
| Benzyl alcohol | 32 |
| Methoxypropylamine | 1.5 |
| Monoethanolamine | 1.5 |
| Methocel XUS 40443 | 0.2 |
| Carbopol 690 | 0.4 |
| Surfynol 104A | 0.5 |
| Triethanolamine | 0.3 |
| Sodium Silicate | 0.2 |
| Sodium hydroxide | 0.1 |
| Water | remainder |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A paint-stripper composition comprising
   (A) from about 10% to about 80% by weight of at least one organic solvent selected from the group consisting of benzyl alcohol alkyl-substituted benzyl alcohols, furfuryl alcohol, alkyl-substituted furfuryl alcohols and acetylenic alcohols containing from 3 to about 5 carbon atoms;
   (B) from about 1% to about 20% by weight of pyrrole;
   (C) from about 0.1% to about 8% by weight of at least one other organic amine compound as an activator; and
   (D) water.

2. The composition of claim 1 comprising at least about 10% by weight of water.

3. The composition of claim 1 wherein the solvent (A) is benzyl alcohol or an alkyl-substituted benzyl alcohol wherein the alkyl group contains from 1 to about 4 carbon atoms.

4. The composition of claim 1 wherein the at least one other amine (C) is an aliphatic amine.

5. The composition of claim 1 wherein the at least one other amine (C) is a primary aliphatic amine or an aliphatic oxime containing at least 2 carbon atoms.

6. The composition of claim 1 wherein the at least one other amine (C) comprises oxyalkylamines, hydroxylamines and diamines.

7. An aqueous paint-stripper composition comprising:
   (A) from about 10% to about 40% by weight of benzyl alcohol;
   (B) from about 1% to about 20% by weight pyrrole;
   (C) from about 0.1% to about 8% by weight of at least one other organic aliphatic amine; and
   (D) at least about 50% by weight of water.

* * * * *